US 6,597,491 B2
Jul. 22, 2003

(12) United States Patent
Islam et al.

(54) MICROMECHANICAL OPTICAL SWITCH

(75) Inventors: Mohammed N. Islam, Allen, TX (US); Amos Kuditcher, Allen, TX (US)

(73) Assignee: Cheetah Omni, LLC, Allen, TX (US)

(*) Notice: Subject to any disclaimer, the term of this patent is extended or adjusted under 35 U.S.C. 154(b) by 0 days.

(21) Appl. No.: 10/227,056

(22) Filed: Aug. 22, 2002

(65) Prior Publication Data
US 2003/0035194 A1 Feb. 20, 2003

Related U.S. Application Data

(62) Division of application No. 10/131,744, filed on Apr. 22, 2002, which is a continuation of application No. 09/631,276, filed on Aug. 1, 2000, now Pat. No. 6,407,851.

(51) Int. Cl.[7] .................. G02B 26/00; G02B 27/00; G02B 1/10; G02B 6/42
(52) U.S. Cl. .................. 359/291; 359/578; 359/583; 385/16
(58) Field of Search .................. 359/139, 291, 359/578, 583, 589; 385/16, 47

(56) References Cited

U.S. PATENT DOCUMENTS

| 4,011,009 A | 3/1977 | Lama et al. | 385/11 |
| 4,900,119 A | 2/1990 | Hill et al. | 385/27 |
| 5,103,340 A | 4/1992 | Dono et al. | 385/46 |
| 5,212,743 A | 5/1993 | Heismann | 385/11 |
| 5,291,502 A | 3/1994 | Pezeshki et al. | 372/20 |
| 5,311,360 A | 5/1994 | Bloom et al. | 359/572 |
| 5,343,542 A | 8/1994 | Kash et al. | 385/31 |
| 5,459,610 A | 10/1995 | Bloom et al. | 359/572 |
| 5,500,761 A | 3/1996 | Goossen et al. | 359/290 |
| 5,654,819 A | 8/1997 | Goossen et al. | 359/291 |
| 5,659,418 A | 8/1997 | Yurke | 359/290 |
| 5,661,592 A | 8/1997 | Bornstein et al. | 359/291 |

(List continued on next page.)

FOREIGN PATENT DOCUMENTS

| EP | 0 667 548 A1 | 8/1995 | G02B/26/02 |
| EP | 0 689 078 A1 | 12/1995 | G02B/26/08 |
| EP | 0 788 005 A2 | 8/1997 | G02B/26/02 |
| EP | 1 213 261 A2 | 6/2002 | B81B/3/00 |
| WO | 99/34484 | 7/1999 | |
| WO | WO 01/37021 A1 | 11/2000 | G02B/6/42 |
| WO | 01/09995 A1 | 2/2001 | H01S/5/00 |
| WO | WO 02/056521 A1 | 2/2001 | H04J/14/00 |
| WO | WO 01/79795 A1 | 3/2001 | G01J/3/28 |

(List continued on next page.)

OTHER PUBLICATIONS

K. E. Petersen, "Micromechanical Light Modulator Array Fabricated On Silicon," Applied Physics Letters, vol. 31, No. 8, pp. 521–523, Oct. 15, 1977.

C. Marxer, et al., "Megahertz Opto–Mechanical Modulator," Elsevier Science S.A., pp. 46–50, 1996.

C. M. Ragdale, et al., "Integrated Three Channel Laser and Optical Multiplexer for Narrowband Wavelength Division Multiplexing," Electronics Letters, vol. 30, No. 11, pp. 897–898, May 26, 1994.

(List continued on next page.)

Primary Examiner—Hung Xuan Dang
Assistant Examiner—David N. Spector
(74) Attorney, Agent, or Firm—Baker Botts L.L.P.

(57) ABSTRACT

An optical switch element is described, which includes a fixed layer disposed outwardly from a substrate and a movable mirror assembly disposed outwardly from the fixed layer. The moveable mirror assembly is operable to move relative to the fixed layer responsive to a voltage applied to the movable mirror assembly. In a particular embodiment, the movable mirror assembly includes an inner strip spaced apart from the fixed layer by a first distance and an outer strip disposed approximately adjacent to the inner strip and spaced apart from the fixed layer by a second distance which is greater than the first distance. The optical transmission of the optical switch element changes depending on the position of the movable mirror assembly.

33 Claims, 5 Drawing Sheets

U.S. PATENT DOCUMENTS

| | | | |
|---|---|---|---|
| 5,701,193 A | 12/1997 | Vogel et al. | 359/290 |
| 5,739,945 A | 4/1998 | Tayebati | 359/291 |
| 5,745,271 A | 4/1998 | Ford et al. | 359/130 |
| 5,751,469 A | 5/1998 | Arney et al. | 359/291 |
| 5,774,252 A | 6/1998 | Lin et al. | 359/224 |
| 5,825,528 A | 10/1998 | Goossen | 359/291 |
| 5,835,255 A | 11/1998 | Miles | 359/291 |
| 5,841,579 A | 11/1998 | Bloom et al. | 359/572 |
| 5,850,492 A | 12/1998 | Morasca et al. | 385/11 |
| 5,870,221 A | 2/1999 | Goossen | 359/290 |
| 5,909,303 A | 6/1999 | Trezza et al. | 359/248 |
| 5,914,804 A | 6/1999 | Goossen | 359/291 |
| 5,920,391 A | 7/1999 | Grasdepot et al. | 356/352 |
| 5,943,155 A | 8/1999 | Goossen | 359/247 |
| 5,943,158 A | 8/1999 | Ford et al. | 359/295 |
| 5,943,454 A | 8/1999 | Aksyuk et al. | 385/22 |
| 5,949,571 A | 9/1999 | Goossen et al. | 359/291 |
| 5,949,801 A | 9/1999 | Tayebati | 372/20 |
| 5,960,133 A | 9/1999 | Tomlinson | 385/18 |
| 5,974,207 A | 10/1999 | Aksyuk et al. | 385/24 |
| 5,986,796 A | 11/1999 | Miles | 359/260 |
| 5,999,319 A | 12/1999 | Castracane | 359/573 |
| 6,002,513 A | 12/1999 | Goossen et al. | 359/291 |
| 6,025,950 A | 2/2000 | Tayebati et al. | 359/244 |
| 6,041,071 A | 3/2000 | Tayebati | 372/64 |
| 6,123,985 A | 9/2000 | Robinson et al. | 427/162 |
| 6,204,946 B1 | 3/2001 | Aksyuk et al. | 359/131 |
| 6,271,052 B1 | 8/2001 | Miller et al. | 438/50 |
| 6,301,274 B1 | 10/2001 | Tayebati et al. | 372/20 |
| 6,341,039 B1 | 1/2002 | Flanders et al. | 359/578 |
| 6,373,632 B1 | 4/2002 | Flanders | 359/578 |
| 6,381,387 B1 | 4/2002 | Wendland, Jr. | 385/37 |
| 6,407,851 B1 * | 6/2002 | Islam et al. | 359/291 |
| 6,439,728 B1 | 8/2002 | Copeland | 359/515 |
| 2001/0055147 A1 | 12/2001 | Little et al. | 359/293 |
| 2002/0105697 A1 | 8/2002 | Fabiny | 359/128 |

FOREIGN PATENT DOCUMENTS

| | | | | |
|---|---|---|---|---|
| WO | WO 02/06860 A1 | 7/2001 | | G02B/5/18 |
| WO | WO 02/10822 A1 | 7/2001 | | G02B/6/34 |
| WO | 01/67156 A2 | 9/2001 | | G02B/26/00 |
| WO | 01/67157 A2 | 9/2001 | | G02B/26/00 |
| WO | 01/67158 A2 | 9/2001 | | G02B/26/00 |
| WO | 01/67171 A2 | 9/2001 | | G02F/1/21 |
| WO | WO 02/21191 A1 | 9/2001 | | G02B/27/10 |
| WO | 01/75497 A1 | 10/2001 | | G02B/6/35 |
| WO | WO 02/50588 A1 | 12/2001 | | G02B/6/26 |
| WO | WO 02/059655 A2 | 12/2001 | | |

OTHER PUBLICATIONS

K. O. Hill, et al., "Narrow–Bandwidth Optical Waveguide Transmission Filters," Electronic Letters, vol. 23, No. 9, pp. 465–466, Apr. 23, 1987.

C. M. Ragdale, et al., "Integrated Laser and Add–Drop Optical Multiplexer for Narrowband Wavelength Division Multiplexing," Electronic Letters, vol. 28, No. 89, pp. 712–714, Apr. 9, 1992.

K. Aratani, et al., "Process and Design Considerations for Surface Micromachined Beams for A Tuneable Interferometer Array in Silicon," Handbook of Physics, pp. 230–235, 1993.

O. Solgaard, et al., "Deformable Grating Optical Modulator," Optics Letters, vol. 17, No. 9, pp. 688–690, May 1, 1992.

W. R. Wiszniewski, et al., Mechanical Light Modulator Fabricated On A Silicon Chip Using Simox Technology, pp. 1027–1030.

M.W. Chbat, "High–spectral–efficiency transmission systems," OFC 2000, Baltimore, MD, pp TuJ1–1, 134–136, 2000.

J.W. Bayless, et al., "The Specification and Design of Bandlimited Digital Radio Systems," IEEE Transactions on Communications, vol. COM–27 (12): pp. 1763–1770, 1979.

D.E. Sene, et al., "Polysilicon Micromechanical Gratings for Optical Modulation," Elsevier vol. Sensors and Actiators (A 57), pp. 145–151, 1996.

D. M. Burns, et al., "Micro–Electro–Mechanical Variable Blaze Gratings," IEEE 10th Annual International Workshop on Micro Mechanical Systems, pp. 385–391, 1997.

L. Y. Lin, et al., "Micromachined polarization–state controller and its application to polarization–mode dispersion compensation," OFC 2000, Baltimore, MD, pp. ThQ3–1, 244–246, 2000.

J.W. Bayless, et al., "High Density Digital Data Transmission," National Telecommunications Conference, Dallas, TX, pp. 1–6, 1976.

R.W. Corrigan, et al., "17.3: Calibration of a Scanned Linear Grating Light Value™ Projection System," www.siliconlight.com, 1999.

SLM "GLV Technology," www.siliconlight.com, 1999.

R.W. Corrigan, et al., "Grating Light Valve Technology for Projection Displays," Presented at the International Display Workshop, Kobe, Japan, 1998.

M. Ming, et al., "Principles and Applications of Optical Communications," Irwin, pp. 468 & 470, 1996.

SLM "The Grating Light Valve Technology," www.siliconlight.com, 1999.

SLM "The Scanned Grating Light Valve Display Architecture," www.siliconlight.com, 1999.

A. Willner, "WDM Systems 1," OFC '97, Dallas, TX, pp. TuJ, 43–45, 1997.

C. Pu, et al., "Michromachined Integrated Optical Polarization–State Rotator," IEEE Photonics Technology Letters, vol. 12(10), pp. 1358–1360, Oct. 2000.

D. T. Amm, et al., "5.2: Grating Light Valve™ Technology: Update and Novel Applications," Presented at Society for Information Display Symposium, Anaheim, CA, pp. 1–4, May 1998.

D. M. Bloom, "The Grating Light Valve: revolutionizing display technology," www.siliconlight.com, 1998.

D. T. Amm, et al., "Optical Performance of the Grating Light Valve Technology," Presented at Photonics West–Electronic Imaging, Sunnyvale, CA, pp. 1–8, 1999.

J. E. Ford, et al., "Fiber–Coupled Variable Attenuator Using a MARS Modulator," SPIE, vol. 3226, pp. 86–96, 1997.

D. M. Burns, et al., "Development of Michromechanical Variable Blaze Gratings," Elsevier Science S.A., vol. Sensors and Actuators, pp. 7–15, 1998.

C. K. Madsen, et al., "A Tunable Dispersion Compensating MEMS All–Pass Filter," IEEE Photonics Technology Letters, vol. 12 (6), pp. 651–653, 2000.

J. E. Ford, et al., "Passband–Free Dynamic WDM Equalizatin," ECOC '98, Madrid, Spain, pp. 317–318, 1998.

K. W. Goossen, et al., Micromechanical Gain Slope Compensator for Spectrally Linear Optical Power Equalization, 2000.

K. W. Goossen, et al., "Silicon Modulator Based on Mechanically–Active Anti–Reflection Layer with 1 Mbit/sec Capability for Fiber–in–the–Loop Applications," IEEE Photonics Technology Letters, vol. 6 (9), pp. 1119–1121, 1994.

L. Y. Lin, et al., "Angular–Precision Enhancement in Free–Space Micromachined Optical Switches," IEEE Photonics Technology Letters, vol. 11 (10), pp. 1253–1255, 1999.

L. Y. Lin, et al., "Free–Space Micromachined Optical Switches with Submillisecond Switching Time for Large–Scale Optical Crossconnects," IEEE Photonics Technology Letters, vol. 10 (4), pp. 525–527, 1998.

L. Y. Lin, et al., "Optical Crossconnects for High–capacity Lightwave Networks," Jornal of High Speed Networks, pp. 17–34, 1999.

E. P. Furlani, et al., "Analysis of grating light valves with partial surface electrodes," Amercian Institute of Physics, vol. 83 (2), pp. 629–634, 1998.

E. P. Furlanl, et al., "Theory and simulation of viscous damped reflection phase gratings," J. Phys. D: Appl. Phys., vol. 32, pp. 412–416, 1999.

K. Aratani, et al., "Surface micromachined tuneable interferometer array," Sensors and Actuators, vol. 43, pp. 17–23, 1994.

R. T. Howe, et al., "Polycrystalline Silicon Micromechanical Beams," Journal Electrochemical Society, vol. 130 (6), pp. 1420–1423, 1983.

S. R. Mallinson, "Wavelength–selective filters for single–mode fiber WDM systems using Fabry–Perot interferometers," Applied Optics, vol. 26 (3), pp. 430–436, 1987.

L. Y. Lin, et al., "Micromachined Polarization–state–controller and its Application to Polarization–mode Dispersion–compensation," OFC 2000, Baltimore, MD, pp. ThQ3–1, 144–246, 2000.

L. Y. Lin, et al., "Optical–layer Networking: Opportunities for and Progress in LIghtwave Micromachines," OFC 2000, Baltimore, MD, pp. 1–88, 2000.

Author Unknown, "Diffraction and Intereference," Optics, Chapter 6, pp. 102–103.

"Polarization Mode Dispersion (PMD)," Cables & Components Technical Papers, http://www.usa.alcatel.com/cc/techprs/fnlpmd2.htm, 2000.

"Menyuk Tutorial," OFC 2000, pp. 92–94, Mar. 2000.

Agrawal, "Fiber–Optic Communication Systems," A Wiley–Interscience Publication, The Institute of Optics University of Rochester NY, pp. 284–360, 1997.

Ford et al., "Fiber–Coupled Variable Attenuator Using a MARS Modulator," Invited Paper, SPIE, vol. 3226, pp. 86–93, 1997.

Sadot et al., "Tunable Optical Filters for Dense WDM Networks," IEEE Communications Magazine, pp. 50–55, Dec. 1998.

Goossen, "MEMS–Based Variable Optical Interference Device," IEEE, Invited MB1, pp. 17–18, Aug. 2000.

Walker et al., "Mechanical Anti–Reflection Switch (MARS) Device for Fiber–In–the–Loop Applications," Invited FA1, pp. 59–60.

Jerman, "Minature Fabry–Perot Interferometer Micromachined in Silicon for use in Optical Fiber WDM Systems," Transducers '91, International Solid–State Conference on Sensors and Actuators, pp. 372–375, 1991.

Wu et al., "Widely and Continuously Tunable Micromachined Resonant Cavity Detector with Wavelength Tracking," IEEE Photonics Technology Letters, vol. 8, No. 1, pp. 98–99, Jan. 1996.

Vail et al., "GaAs micromachined widely tunable Fabry–Perot Filters," Electronics Letters, vol. 31, No. 3, pp. 228–229, Feb. 2, 1995.

Vail et al., "High performance micromechanical tunable vertical cavity surface emitting lasers," Electronics Letters, vol. 32, No. 20, 2 pages, Sep. 26, 1996.

Tayebati et al., "Microelectromechanical tunable filter with stable half symmetric cavity," Electronics Letters, vol. 34, No. 20, pp. 1967–1968, Oct. 1, 1998.

Tayebati et al., "Microelectromechanical tuneable filters with 0.47 nm linewidth and 70 nm tuning range," Electronics Letters, vol. 34, No. 1, 2 pages, Jan. 8, 1998.

Tayebati et al., "Widely Tunable Fabry–Perot Filter Using Ga(A1)As–A1Ox Deformable Mirrors," IEEE Photonics Technology Letters, vol. 10, No. 3, pp. 394–396, Mar. 1998.

Tran et al., "Surface Micromachined Fabry–Perot Tunable Filter," IEEE Photonics Technology Letters, vol. 8, No. 3, Mar. 1996.

Burns et al., "Optical beam steering using surface micromachined gratings and optical phased arrays," SPIE, vol. 3131, pp. 99–110.

Burns et al, "Designs to improve polysilicon micromirror surface topology," SPIE, vol., 3008, pp. 100–110.

"1–D vs. 2–D vs. 3–D MEMS Optical Switch Architectures," Network Photonics, pp. 1–3.

CrossWave™ A Reliable MEMS–Based Optical Switch, Network Photonics, pp. 1–4.

Vail et al., "GaAs micromachined widely tunable Fabry–Perot filters," Electronics Letters, vol. 31, No. 3, pp. 228–229, Feb. 2, 1995.

Tayebati et al, "Microelectromechanical tunable filter with stable half symmetric cavity," Electronics Letters, vol. 34, No. 20, pp. 1967–1968, Oct. 1, 1998.

Tran et al., "Surface Micromachined Fabry–Perot Tunable Filter," IEEE Photonics Technology Letters, vol. 8, No. 3, pp. 393–395, Mar. 1996.

Ford et al, "Micromechanical Fiber–Optic Attenuator with 3 $\mu$s Response," Journal of Lightwave Technology, vol. 16, No. 9, pp. 1663–1670, Sep. 1998.

Walker et al., "Fabrication of a Mechanical Antireflection Switch for Fiber–to–the–Home Systems," Journal of Microelectromechanical Systems, vol. 5, No. 1, pp. 45–51, Mar. 1996.

Goossen et al., "Micromechanical Gain Slope Compensator for Spectrally linear Optical Power Equalization," IEEE Photonics Technology Letters, vol. 12, No. 7, pp. 831–833, Jul. 2000.

Goossen et al., "Integrated mechanical anti–reflection switch (MARS) device for fiber–to–the–home applications," http://mirlynweb.lib.umich.edu/WebZ/FETCH?sessionid=01–35557–462149016&recno=13&re, May 8, 2002.

"ELASTIC–45 tunable interferometer component," Solus, Preliminary Datasheet and applications.

* cited by examiner

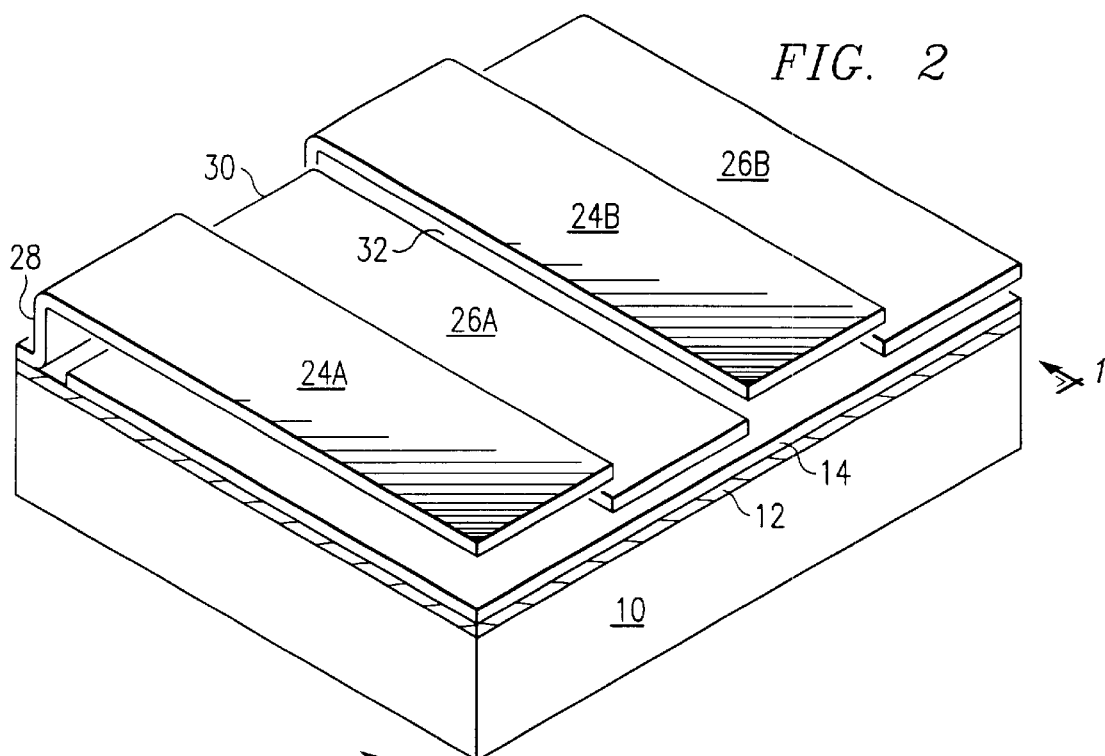
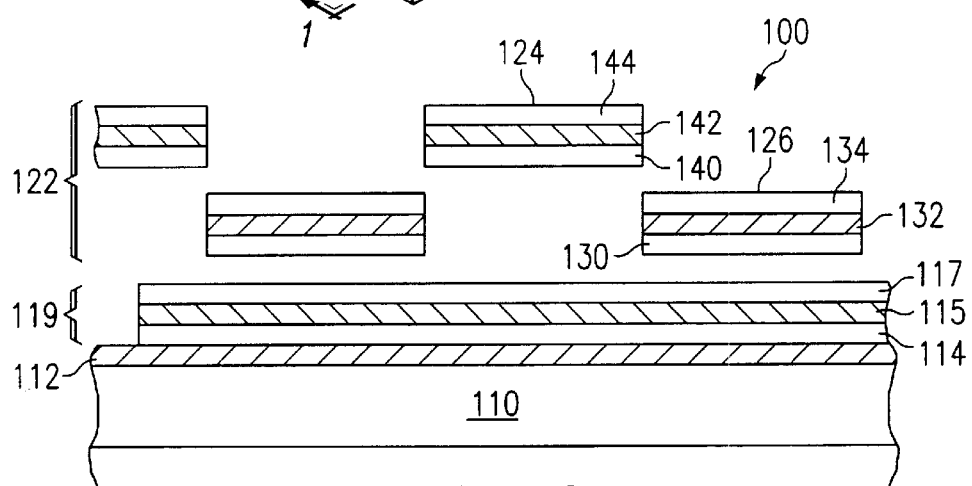
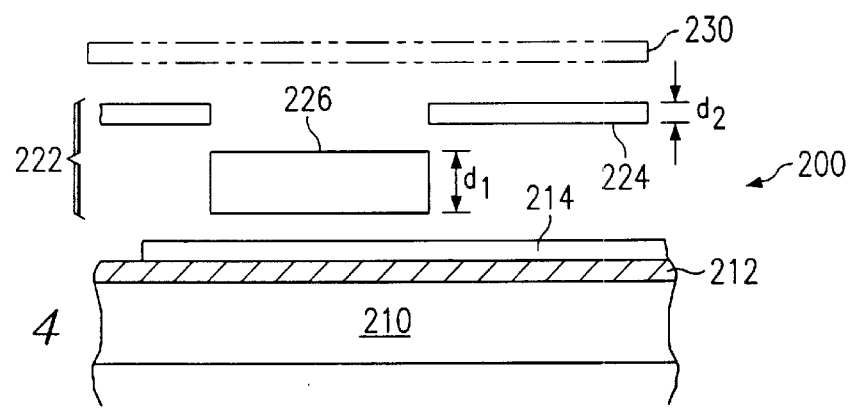

MICROMECHANICAL OPTICAL SWITCH

CROSS REFERENCE TO RELATED APPLICATIONS

This application is a divisional of Application Ser. No. 10/131,744, by Mohammed N. Islam et al, filed Apr. 22, 2002, entitled "Micromechanical Optical Switch, which is a continuation of Application Ser. No. 09/631,276, by Mohammed N. Islam et al, filed Aug. 1, 2000, and entitled "Micromechanical Optical Switch," now U.S. Pat. No. 6,407,851. This Application is being filed as a divisional application on Applicants' volition and not as the result of any formal election restriction requirement.

TECHNICAL FIELD OF THE INVENTION

This invention relates in general to the field of electro-optical systems and more particularly to an improved optical switch element and methods of forming and using the element.

BACKGROUND OF THE INVENTION

The ability to transmit information in the optical domain has greatly enhanced the speed and bandwidth of data communications. In comparison, the inability to selectively route logical signals that are transmitted in the optical domain has restricted the ability of network designers to accomplish data communications solely in the optical domain. Accordingly, before a signal can be routed or switched it must first be converted into electrical signals which can be logically processed using conventional electrical digital computing systems.

There have been a number of attempts to create a workable optical switch architecture which allows for the selective routing of light beams carrying data communications. Some of these solutions have involved the formation of micromechanical structures using semiconductor processing techniques. These micromechanical structures typically do not provide suitable speed or reliability for cost-effective commercial applications. For example, many micromechanical structures suffer from air damping effects, which increase the required drive voltage and slow the operation of the device. In addition, these devices have not been tunable to optimize switching speeds according to common packet sizes encountered by the switch.

SUMMARY OF THE INVENTION

Accordingly, a need has arisen for an improved optical switching element and optical switching system that comprises a structure that can be reliably fabricated and that will operate at switching speeds associated with optical data communications.

According to the teachings of the present invention, a micromechanical optical switch element is provided that substantially eliminates or reduces problems associated with prior systems.

In accordance with one embodiment of the present invention an optical switch element comprises a fixed layer disposed outwardly from a substrate and a movable mirror assembly disposed outwardly from the fixed layer. The moveable mirror assembly is operable to move relative to the fixed layer responsive to a voltage applied to the movable mirror assembly. In one embodiment, the movable mirror assembly includes an inner strip spaced apart from the fixed layer by a first distance and an outer strip disposed approximately adjacent to the inner strip and spaced apart from the fixed layer by a second distance which is greater than the first distance. The optical transmission of the optical switch element changes depending on the position of the movable mirror assembly.

In accordance with another embodiment of the present invention, an optical switch element comprises a fixed mirror layer disposed outwardly from a substrate, and a movable mirror assembly comprising an inner mirror strip and an outer mirror strip disposed approximately adjacent to and outwardly from the inner mirror strip. In a particular embodiment, the fixed mirror layer and the movable mirror assembly define a Fabry-Perot interference cavity, wherein the movable mirror assembly is operable to move with respect to the fixed mirror layer to change the reflective or transmissive qualities of the switch element.

In accordance with another embodiment of the present invention, an optical switch element comprises a fixed layer disposed outwardly from a substrate, and a unitary movable mirror assembly disposed outwardly from the fixed layer and forming with the fixed layer an optical cavity. The moveable mirror assembly is operable to move relative to the fixed layer in response to a voltage applied to the moveable mirror assembly to affect a change in the transmissive characteristics of the optical cavity. The optical switch element is operable to switch between a substantially transmissive state and a less than substantially transmissive state at a rate optimized for a specified packet size.

According to yet another aspect of the invention, a method of forming an optical switch comprises forming a fixed layer outwardly from a substrate and forming a movable mirror assembly outwardly from the fixed layer. In a particular embodiment, the movable mirror assembly comprises an inner strip disposed outwardly from the fixed layer by a first distance and an outer strip disposed approximately adjacent to the inner strip and spaced apart from the fixed layer by a second distance which is greater than the first distance. The optical transmission of the optical switch element changes depending on the position of the movable mirror assembly.

According to still another aspect of the invention, a method of communicating optical signals comprises receiving an optical signal at an optical switch element having a fixed layer and a moveable mirror assembly disposed outwardly from the fixed layer. In one embodiment, the moveable mirror assembly includes an inner strip spaced apart from the fixed layer by a first distance and an outer strip disposed approximately adjacent to the inner strip and spaced apart from the fixed layer by a second distance which is greater than the first distance. The method further comprises applying a voltage to the moveable mirror assembly to change its position relative to the fixed layer and cause a change in the optical transmission of the optical switch element.

In accordance with another embodiment of the present invention, an optical switch includes a Mach-Zender interferometer comprising an optical switch element having a fixed layer disposed outwardly from a substrate, and a movable mirror assembly disposed outwardly from the fixed layer and operable to move relative to the fixed layer responsive to a voltage applied to the movable mirror assembly. In a particular embodiment, the movable mirror assembly comprises an inner strip spaced apart from the fixed layer by a first distance; and an outer strip disposed approximately adjacent to the inner strip and spaced apart from the fixed layer by a second distance which is greater than the first distance. The optical transmission of the optical switch element changes depending on the position of the movable mirror assembly.

In accordance with yet another embodiment of the invention, an optical switch comprises a pair of collimating lens each having a central axis and each coupled to a fiber so that the axis of each collimating lens is at least partially offset from the axis of the fiber. The switch further comprises an optical switch element disposed between the collimating lenses along the central axis of the fiber and spaced from each of the lenses by approximately a focal length of the respective lens, wherein the optical switch element is operable to receive optical signals from one collimating lens and to either transmits those signals to the other collimating lens or to reflect those signals depending on the position of a moveable mirror assembly relative to a fixed layer within the switch element.

In still another embodiment of the present invention, an optical switch, comprises a first optical switch element operable to receive an optical signal and a second optical switch element operable to receive an optical signal, the second optical switch element coupled to the first optical switch element over a first mode. The first and second optical switch elements coupled to a single mode fiber wherein the first mode at least partially overlaps the mode of the single mode fiber so that optical signals from the first and second switch element couple to the fiber only when the first and second switch elements are substantially in phase with one another.

According to another aspect of the invention, an electro-optic router operable to receive and switch a plurality of optical signals, the router comprises a fiber optic tap operable to receive an optical signal and to separate the optical signal into a first signal portion and a second signal portion. The router further comprises a delay line operable to receive the first signal portion and to delay transmission of the first signal portion until the second signal portion has been processed, and an electronic processor operable to receive the second signal portion, and to perform electronic processing on the second signal portion. The router still further comprises an array of optical switch elements operable to receive the first and second signal portions and to perform an optical switching operation on the first and second signal portions.

In another aspect of the invention, an electro-optic router is operable to receive a plurality of optical signals and to switch the optical signals using an array of optical switch elements. At least one of the optical switch elements comprises a fixed layer disposed outwardly from a substrate and a movable mirror assembly disposed outwardly from the fixed layer and operable to move relative to the fixed layer responsive to a voltage applied to the movable mirror assembly. In a particular embodiment, the movable mirror assembly comprises an inner strip spaced apart from the fixed layer by a first distance and an outer strip disposed approximately adjacent to the inner strip and spaced apart from the fixed layer by a second distance which is greater than the first distance, wherein the optical transmission of the optical switch element changes depending on the position of the movable mirror assembly.

In still another aspect of the invention, a fault tolerant network comprises an ingress access node operable to receive an optical signal from a network element external to the fault tolerant network. The fault tolerant network further comprises a fault tolerant node operable to receive the optical signal from the ingress access node and to perform a switching operation on the optical signal depending on a voltage applied to an optical switch element within the fault tolerant node, wherein the fault tolerant node allows transmission of the optical signal when no voltage is applied to the switching element.

BRIEF DESCRIPTION OF THE DRAWINGS

A more complete understanding of the present invention may be acquired by referring to the accompanying figures wherein like reference numbers indicate like features and wherein:

FIG. 2 is a greatly enlarged perspective illustration of a portion of an optical switching element constructed according to the teachings of the present invention;

FIG. 3 is a greatly enlarged cross-sectional elevational diagram illustrating another embodiment of an optical switching element constructed according to the present invention;

FIG. 4 is a greatly enlarged cross-sectional elevational diagram illustrating still another embodiment of an optical switching element constructed according to the present invention;

DETAILED DESCRIPTION OF THE INVENTION

Figure 1A:
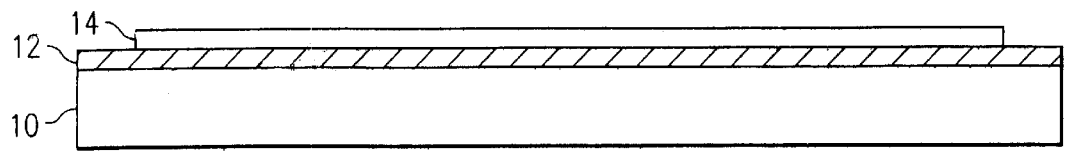
FIGS. 1A through 1E are greatly enlarged cross-sectional elevational diagrams illustrating a method of formation and the operation of an optical switching element constructed according to the teachings of the present invention.

The optical switching element of the present invention is formed on an outer surface of a substrate 10 shown in FIG. 1A. Substrate 10 may comprise, for example, n-type silicon or indium phosphide. As will be described herein, in one mode of operation, it is advantageous if the substrate is optically transmissive in the wavelength range of the optical signal to be switched by the element. To facilitate that mode of operation, in a particular embodiment, a single crystalline silicon substrate can be manufactured so that it is optically transmissive in the range of wavelengths between approximately 1,300 to approximately 1,700 nanometers with an optimal transmissive wavelength of approximately 1,500 nanometers.

Referring again to FIG. 1A, an antireflective layer 12 is deposited or grown on an outer surface of the substrate 10. Antireflective layer 12 may comprise, for example, a layer of silicon nitride. In the illustrated embodiment, layer 14 is formed to be one-quarter wavelength in optical thickness.

The optical thickness and physical thickness are related by the equation $$d = \frac{\lambda}{4n}$$

where d is the physical thickness, n is the index of refraction of the material through which the light is passing, and λ is the wavelength of the light. For a optimum wavelength of 1.5 microns or 1,500 nanometers and a refractive index of silicon nitride which is equal to approximately 1.9 at this wavelength, the physical thickness of antireflective layer 12 will be approximately 2,000 Angstroms. It is advantageous if the index of refraction of the substrate is approximately the square of the index of refraction of the material comprising antireflective layer 12. The effective optical thickness of layer 12 can be tuned to more closely approximate one-quarter wavelength, for example, by changing the ratio of silicon and nitride during its formation or by changing the physical thickness of that layer.

Other materials can be used to form the antireflective layer 12. For example, layer 12 may comprise silicon dioxide or other suitable dielectric material or combination of materials. Although antireflective layer 12 has been described as having an optical thickness of one-quarter wavelength, antireflective layer 12 will operate adequately at an optical thickness of anywhere between one-eighth of the wavelength and three-eighths of the wavelength.

Referring again to FIG. 1A, a fixed layer 14 is formed outwardly from antireflective layer 12. In a particular embodiment where fixed layer 14 will comprise part of a Fabry-Perot interference cavity, fixed layer 14 comprises a fixed mirror layer formed from an at least partially reflective material.

In one embodiment, fixed layer 14 may comprise, for example, polycrystalline silicon (polysilicon) which has been doped sufficiently to render it at least substantially conductive. Fixed layer 14 may be doped, for example, using phosphorous or other suitable dopant or dopants. Forming fixed layer 14 from polysilicon facilitates at least some transmission of optical signals incident on fixed layer 14 through substrate 10. This construction may be useful, for example, where element 10 will be used as an optical switch operating in a pass-through mode.

In an alternative embodiment, fixed layer 14 may be formed from a metal, such as gold or aluminum, which is substantially reflective of the incident optical signals. This embodiment could be useful, for example, in an optical switch using a non-pass through mode. Where a metal is used to form fixed layer 14, a protective layer may be grown or deposited outwardly from fixed layer 14.

In the illustrated embodiment, fixed layer 14 is also formed to an optical thickness of approximately one-quarter wavelength. Where fixed layer 14 is constructed to provide an optical thickness of approximately one-quarter wavelength, the physical thickness of fixed layer 14 will be on the order of 1,000 Angstroms. The relatively smaller physical thickness of fixed layer 14 results from the relatively larger index of refraction of silicon, which is typically on the order of 3.5. Although not shown in the cross-section illustrated in FIG. 1A, suitable polysilicon conductive structures, bond pads, and other structures may be created so that a voltage signal can be applied to fixed layer 14.

Figure 1B:
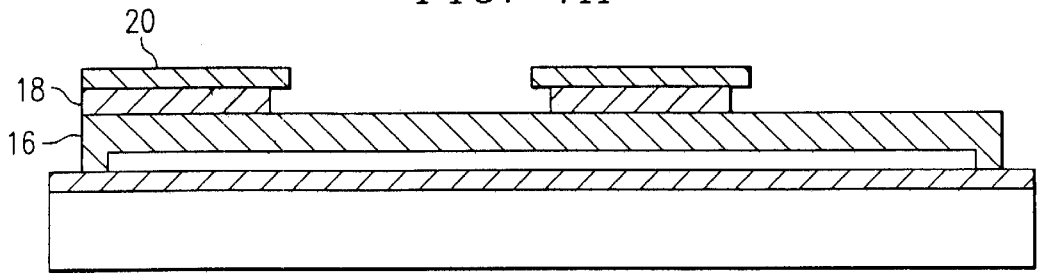

Referring to FIG. 1B, a number of sacrificial layers are formed outwardly from fixed layer 14 to provide an interim substrate on which to form a movable outer mirror assembly. An inner sacrificial layer 16 is formed outwardly from fixed layer 14. Layer 16 may comprise, for example, silicon dioxide deposited to a depth that will eventually represent the spacing between fixed layer 14 and an inner strip portion of the movable mirror assembly. In a particular embodiment, this spacing defines an air gap on the order of one-half of a wavelength in thickness. Accordingly, for a 1.5 micron wavelength, the spacing should be on the order of 7,500 Angstroms in depth.

In an alternative embodiment, this air gap could be on the order of one full wavelength. This embodiment provides an advantage of ensuring that the upper mirror assembly 27 does not contact the fixed layer 14 when a voltage is applied between those layers. In that case, inner sacrificial layer 16 should be formed to a depth of approximately 15,000 Angstroms for a 1.5 micron wavelength signal. In other embodiments, inner sacrificial layer 16 could be formed to any integer multiple number of one half wavelengths and remain within the scope of this invention. Protective pads, or stops, could also be formed outwardly from fixed layer 14 and inwardly from the movable mirror layer (to be later formed) to further protect against the moveable mirror assembly 27 contacting fixed layer 14 during operation.

A median sacrificial layer 18 is formed on the outer surface of inner sacrificial oxide layer 16. Layer 18 may comprise, for example, a layer of phosphosilicate glass deposited to a depth on the order of 5,000 Angstroms. An outer sacrificial oxide layer 20 is formed on the outer surface of layer 18. Outer sacrificial oxide layer 20 may comprise, for example, a layer of silicon dioxide formed to a depth on the order of 2,500 Angstroms.

In the illustrated embodiment, dimensions of layers within the optical switching element are selected to provide light transmission through the optical switching element during a no-voltage condition. In this manner, the invention provides an advantage of facilitating signal passthrough upon an element failure. The illustrated embodiment facilitates this characteristic by forming inner sacrificial layer 16 to ultimately provide an air gap that is one half wavelength or an integer multiple of one-half of one wavelength of the optical signal received.

In another embodiment, the optical switching element could be constructed to operate in a non-transmissive mode during a no-voltage condition. For example, inner sacrificial layer 16 can be formed to ultimately provide an air gap comprising an odd integer multiple of one-quarter wavelengths of the optical signal.

The structure formed by sacrificial layer 16, 18 and 20 is patterned using conventional photolithographic techniques and etched using a suitable plasma assisted fluorine based etchant process to expose portions of the outer surface of layer 16. As a particular example, a hydrogen fluoride etchant may be used comprising 15 milliliters of 49 percent hydrofluoric acid, 10 milliliters of $HNO_3$, and 300 milliliters of water. This reactant will result in an etch rate on the order of 128 Angstroms per minute. In another example, a gas mixture for plasma etching may contain oxygen and trifluoromethane in a pressure ratio on the order of 6:85. At an RF power of about 28 W, the plasma formed from this gas mixture etches 8% LTO at a rate approaching 380 angstroms per minute. Other suitable etching procedures could be used without departing from the scope of the invention.

The structure resulting from the etch process is shown in FIG. 1B. It should be noted that the differing properties of silicon dioxide and phosphosilicate glass result in an undercutting of layer 18 resulting in extensions of layer 20 over and past the borders of layer 18. For example, phosphosilicate glass typically etches more quickly than silicone dioxide in the presence of a fluorine based etchant. By selecting appropriate materials, amounts, and locations for the sacrificial layers 16–20 as well as an appropriate etchant, etch rate, and temperature, the amount of undercut can be controlled. This undercutting is also shown in FIG. 1B. This undercut allows for the self-aligned formation of the outer movable mirror layer strips to occur relative to the inner strips described previously. The above-described process provides efficiency advantages in manufacture by creating the resulting undercut structure using a single etch.

Figure 1C:
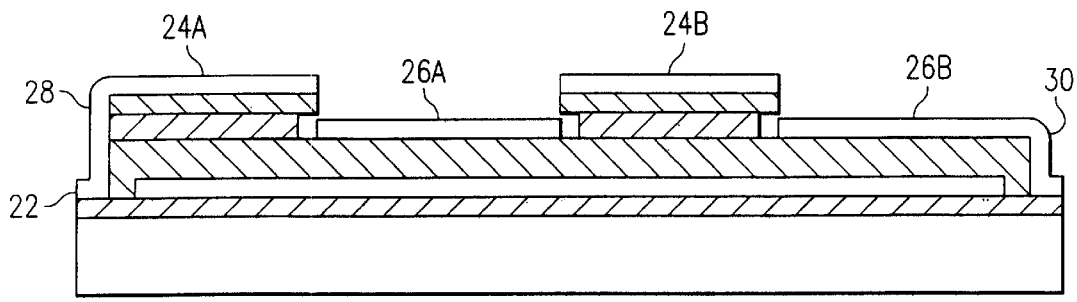

Referring to FIG. 1C, a movable mirror layer 22, which may comprise polysilicon doped with a sufficient amount of, for example, phosphorous to render it at least substantially conductive is formed outwardly from the exposed portions of layers 16 and 20. Movable mirror layer 22 is comprised of outer mirror strips, which are exemplified by strips 24a and 24b shown in FIG. 1C and inner mirror strips, which are exemplified by inner mirror strips 26a and 26b shown in FIG. 1C. In the illustrated embodiment, each of outer layer strips 24 and inner layer strips is formed to a depth on the order of 1,000 Angstroms in thickness using the same processes as described with reference to fixed layer 14.

Figure 1D:
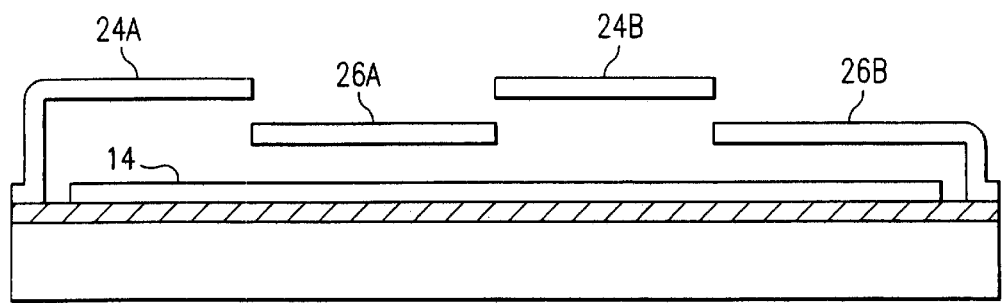

On the periphery of the movable mirror layer 22, the layer 22 is anchored to the substrate by anchor portions 28 and 30. It should be understood that anchor portions 28 and 30 are shown in FIG. 1D solely for purposes of teaching the structure of the present invention. In actual construction, a strip is not anchored at its side as shown in FIG. 1C but rather at its ends (not visible in cross-sectional view of FIGS. 1A–1E). As such, anchors 28 and 30 are actually disposed on opposite ends of the strips as will be discussed and described with reference to FIG. 2 herein.

Figure 1E:
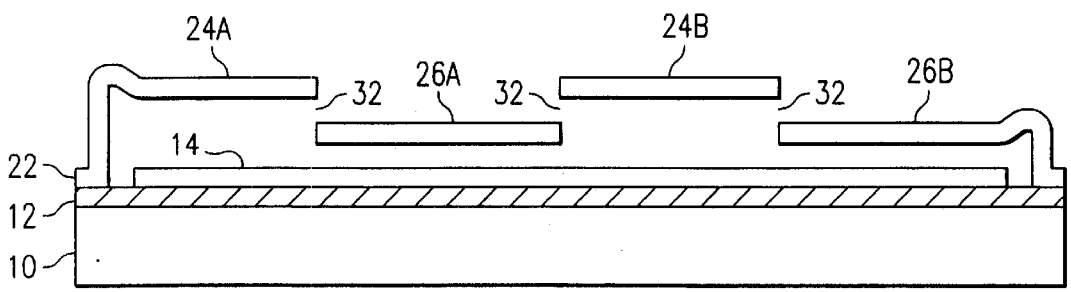

FIG. 1D illustrates the structure following the removal of the sacrificial layers 16, 18 and 20 using a suitable isotropic oxide etch. The removal of these layers results in a movable mirror assembly indicated generally at 27 comprising the outer and inner mirror strips 24a, 24b, and 26a and 26b, respectively. The movable mirror assembly 27 is operable to move relative to the outer surface of substrate 10 and especially the outer surface of the fixed layer 14 as shown in FIG. 1E. In this manner, the distance between the fixed layer 14 and the inner surface of the movable mirror strips 24a–b and 26a–b changes. The change in the distance of this cavity changes the transmissive effects on light that is passing through the assembly 27 and the antireflective layer 12 and the substrate 10. Where fixed layer 14 comprises a fixed mirror layer, the resulting interference structure is commonly referred to as a Fabry-Perot cavity.

Throughout this document, the term "assembly" refers to two or more components that collectively form the assembly. Although a particular embodiment of a moveable mirror assembly has been described as comprising inner and outer strips separated from the fixed mirror layer by different distances, other configurations could be implemented without departing from the present invention. For example, the moveable mirror assembly could comprise a plurality of strips that are each a substantially equal distance from the fixed layer.

In operation of the embodiment shown in FIG. 1, there is an electrical connection to fixed layer 14 and movable mirror strips 24a–b and 26a–b. When a voltage is placed between fixed layer 14 and movable mirror layer 22, the electrostatic force resulting from such a voltage causes movable mirror layer 22 to deform toward fixed layer 14. This deformation causes the transmissive quality of the entire structure to change. For example, in the illustrated embodiment, structures have been formed to provide an approximately one wavelength air gap between fixed layer 14 and inner strips 26a–b, so that the device transmits the optical signal when no voltage is applied. When a voltage is applied and movable mirror assembly 27 is pulled toward fixed mirror assembly 14 by approximately one-quarter of a wavelength, it creates a destructive interference effect, reducing the transmission through the optical element. It should be understood that deformation by a distance equal to any odd multiple of one-quarter of a wavelength will have the same interference effect.

In a particular embodiment, the movement of the moveable mirror assembly is unitary. In this document, the term "unitary" describes a movement in which all of the components operable to move in response to a triggering event move when any of those components move. In the particular embodiment implementing a moveable mirror assembly comprising inner and outer strips, the moveable mirror assembly may undergo a unitary movement causing the inner and outer strips to move substantially in unison. In other embodiments, the components of the moveable mirror assembly may move independent from one another.

Although the embodiment depicted in FIG. 1E shows deformation of movable mirror assembly 27 toward fixed layer 14, alternative structures could be formed to deform movable mirror assembly 27 away from fixed layer 14, creating a similar optical effect. Details of one possible alternate structure for accomplishing this mode of operation will be described below with respect to FIG. 4.

As discussed above, the optical device shown in FIGS. 1A–1E could alternatively be constructed to inhibit light transmission during a non-voltage state. For example, the air gap between inner and outer strips 26 and 24 could comprise an odd integer multiple of one quarter wavelengths, causing destructive interference in the optical cavity during a no-voltage state. In that case, when a voltage is applied to movable mirror assembly 27 causing it to move relative to fixed layer 14 by one-quarter wavelength, or an odd multiple of one-quarter wavelengths, the light incident on the optical element will experience positive interference and be transmitted during an on-voltage state.

Because of the self-aligned formation of inner mirror strips 26 and the spacing between inner mirror strips 26 and the outer mirror strips 24, movable mirror layer 22 is optically equivalent to a smooth planar mirror surface when viewed from a direction perpendicular to the outer surface of the mirror. For example, providing a spacing of an integer multiple of one-half wavelength between the inner and outer movable mirror layers makes the staggered mirror assembly appear to be a continuous mirror from above. As such, the gaps 32, which help control air damping of the movement of assembly 27, are provided without substantially affecting the optical characteristics of the device. In a particular embodiment, the dimensions of air gaps 32 can be specified to provide a desired level of air damping. This may, for example, provide an additional mechanism for controlling the switching speed of the device.

The staggered structure formed by outer mirror strips 24 and inner mirror strips 26 results in exhaust gaps indicated at 32 in FIG. 1E. Exhaust gaps 32 allow for air within the optical cavity to be expelled when movable mirror layer 22 is deformed relative to fixed layer 14. If the gaps 32 were not present the movement of the movable mirror layer 22 would be dampened by the presence of air within the cavity. In the illustrated embodiment, the invention facilitates control of damping effects using exhaust gaps 32, without substantially affecting the optics of the device.

FIG. 2 is a perspective illustration which shows the actual placement of anchors 28 and 30 at the ends of an outer mirror strip 24 and an inner mirror strip 26. FIG. 2 also illustrates the positioning within the structure of the cross-section which was illustrated with reference to FIGS. 1A through 1E previously. It should be noted that FIG. 2 shows only a portion of the optical switch element. The outer and inner mirror strips 24 and 26, respectively, extend the length of the device and have anchor bodies (not explicitly shown) such as anchor bodies 28 and 30 on either end of each strip.

FIG. 3 is a greatly enlarged cross-sectional block diagram of another embodiment of an optical switch 100 constructed according to the teachings of the present invention. In this embodiment, the optical element 100 includes an anti-reflective layer 112 disposed outwardly from a substrate 110. Anti-reflective layer 112 is similar in structure and function to anti-reflective layer 12 discussed with reference to FIG. 1.

Optical element 100 further includes a fixed layer stack 119 disposed outwardly from anti-reflective layer 112. Fixed layer stack 119 is similar in function to fixed layer 14 of FIG. 1. However, rather than implementing only a single fixed layer, fixed layer stack 119 utilizes multiple alternating layers of polysilicon and dielectric material. In this example, fixed layer stack 119 includes an interstitial fixed layer 115 disposed between a first fixed layer 114 and a second fixed layer 117. Additional alternating layers could be added without departing from the scope of the invention. Using one or more multilayer stacks to form fixed layer stack 119 provides an advantage of increasing the reflectivity of the assembly 119. This, in turn, increases the contrast ratio of the transmissive state of element 100, allowing for a higher finesse optical cavity, particularly where the cavity is a Fabry-Perot cavity.

In this example, first and second fixed layers 114 and 117 each have optical thicknesses of approximately one quarter wavelength of the optical signal to be switched. As a particular example, each of first and second fixed layers 114 and 117 could comprise approximately 1000 Angstroms of polysilicon doped sufficiently to render them at least substantially conductive. Interstitial fixed layer 115 could comprises approximately 2000 Angstroms of silicon nitride.

Optical device 100 further includes a movable mirror assembly 122 disposed outwardly from fixed layer stack 119. Movable mirror assembly 122 includes inner strips 126 and outer strips 124. In the illustrated embodiment, each inner strip 126 includes an inner polysilicon layer 130, an interstitial layer 132 disposed outwardly from inner polysilicon layer 130, and an outer polysilicon layer 134 disposed outwardly from interstitial layer 132. Polysilicon layers 130 and 134 may each comprise, for example, polysilicon that has been doped sufficiently to render it at least substantially conductive. An appropriate dopant may comprise, for example, phosphorous.

Interstitial layer 132 may comprise, for example, silicon nitride or other suitable dielectric material or combination of materials. In the example shown in FIG. 3, outer strip 124 includes an inner polysilicon layer 140, an interstitial layer 142 disposed outwardly from inner polysilicon layer 140, and an outer polysilicon layer 144 disposed outwardly from interstitial layer 142. Layers 140–144 of outer strip 124 in this example are similar in structure and function to layers 130–134, respectively, of inner strip 126. For example, layers 140 and 144 may comprise doped polysilicon and interstitial layer 142 may comprise silicon nitride.

In this example, each of layers 130–134 and 140–144 is formed to provide an optical thickness of one-quarter of a wavelength of the optical signal received by element 100. In this example, polysilicon layers 130, 134, 140, and 144 each comprises approximately 1000 Angstroms. Interstitial layers 132 and 142 each comprises approximately 2000 Angstroms of silicon nitride. Although the illustrated embodiment shows a moveable mirror assembly having a stack of three alternating polysilicon and interstitial layers, additional alternating layers of polysilicon and dielectric material could be used without departing from the scope of the invention. Like the multi-layer stacks used to form fixed layer stack 119, the multilayer stacks forming strips 124 and 126 provide increased reflectivity, better contrast ratios, and a higher finesse optical cavity.

FIG. 4 is a greatly enlarged cross-sectional elevational diagram illustrating another embodiment of an optical switching element 200 constructed according to the teachings of the present invention. Element 200 is similar in structure and function to element 100 shown in FIG. 3. Element 200 shown in FIG. 4 includes an inner fixed layer 214 disposed outwardly from an anti-reflective layer 212 and a substrate 210. Element 200 also includes a movable mirror assembly 222 disposed outwardly from inner fixed layer 214. Movable mirror assembly 222 includes one or more inner strips 226 and one or more outer strips 224. In this embodiment, inner strip 226 comprises a thickness $d_1$ and outer strip 224 comprises a thickness $d_2$. In this example, the thickness $d_1$ of inner strip 226 is greater than thickness $d_2$ of outer strip 224. By using different thicknesses for the inner and outer strips of movable mirror assembly 224, the contrast ratio of the device can be improved. Although the illustrated embodiment shows thickness $d_1$ of inner strip 226 as being greater than thickness $d_2$ of outer layer 224, the thickness $d_2$ of outer strip 224 could be greater than thickness $d_1$ of inner strip 226.

In this particular embodiment, element 200 includes an outer fixed layer 230 disposed outwardly from moveable mirror assembly 222. Second fixed layer 230 can be formed, for example, with polysilicon formed to a thickness of approximately one quarter wavelength of the optical signal received. Second fixed layer 230 may be doped to render it at least substantially conductive. Outer fixed layer 230 is separated from moveable mirror assembly 222 by an air gap of one half wavelength of the optical signal received. The air gap could alternatively comprise any integer multiple of signal wavelengths. Providing an air gap of one full wavelength provides an advantage of ensuring that the moveable mirror assembly 222 will not contact the outer fixed layer 230 during operation.

In operation of this embodiment, a voltage can be applied between moveable mirror assembly 222 and outer fixed layer 230. This voltage causes moveable mirror assembly 222 to deform toward outer fixed layer 230 and away from inner fixed layer 214, which changes the transmissive or reflective characteristics of the device. For example, the air gaps and layer thicknesses can be selected to provide a substantially transmissive state when no voltage is applied between moveable mirror assembly and outer fixed layer, and a less than substantially transmissive state when a voltage is applied between those layers.

In a particular embodiment, a first voltage may be applied between moveable mirror assembly 222 and outer fixed layer 230 to cause moveable mirror assembly 222 to deform away from inner fixed layer 222. At an appropriate time, and a second voltage can be applied between moveable mirror assembly 222 and inner fixed layer 214 to cause moveable mirror assembly 222 to deform toward inner fixed layer 214. Through a suitable combination of alternating voltage applications, optical element 200 can be forced to switch between substantially transmissive and less transmissive states. Using alternating voltages to switch the optical characteristics of the device can result in even faster switching rates than single voltage approaches.

The present invention contemplates the use of some, all, or none of the above described features of stacked fixed and mirror layers, inner and outer moveable mirror layers, varying strip thicknesses, and inner and outer fixed layers. An optical switch element within the scope of this invention could be constructed using any combination of some, all, or none of these particular characteristics.

Figure 5:
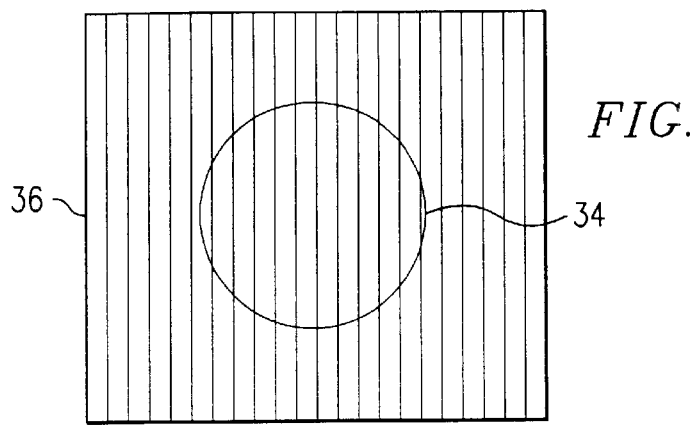
FIG. 5 is a greatly enlarged planar diagram of an optical switching element constructed according to the teachings of the present invention.

FIG. 5 illustrates a planar view of one possible embodiment of an optical switching element. The element comprises a plurality of strips that are alternatively inner and outer mirror strips such as strips 24 and 26 discussed previously. In this particular example, the element is approximately square and on the order of 100 to 500 microns on a side. FIG. 5 also illustrates the placement of an optical beam indicated at 34 in FIG. 5. A typical optical beam will be approximately 100 to 150 microns in diameter. The element indicated at 36 in FIG. 5 is approximately twice the size on a side as the diameter of the beam 34. Accordingly, the length of each strip would be on the order of 100 to 500 microns in length. Further, if each strip is on the order of 2 microns in width, there would be approximately 100 strips if the element 36 was 200 microns on a side. Although particular shapes and dimensions have been described with respect to the element shown in FIG. 5, any of a variety of component configurations and dimensions could alternatively be implemented without departing from the scope of the invention.

The optical switching element of the present invention enjoys the benefit that the gaps 32 allow for extremely fast operation of the device while controlling air damping of the movement of the movable mirror layer 22. Further, the fact that the movable mirror is formed in parallel offset strips provides for uniform voltage distribution across the entire element. The flow of energy as the voltage potential builds on the movable mirror layer is made a great deal more uniform by the parallel strips than it would be if the movable mirror layer was a single plate of conductive material. The movable mirror strips are formed so that they are under a preset amount of tension. The length of the strips, their thickness and width, can be kept small so that each strip has a very low individual mass. A strip that is under a large amount of tension and has a low mass will have a correspondingly higher resonant frequency. The speed at which the device operates is greatly enhanced by a high resonant frequency within the movable element.

By appropriate selection of, for example, material type, amounts of materials, strip dimensions, and/or strip tension, the invention facilitates tuning of switching speeds to maximize switching efficiency. This can be extremely useful in tuning switching speeds to correspond to, for example, common information packet sizes.

For example, the following table shows IP packet sizes in bytes and the total number of packets percent bytes during the years 1998 and 1999.

| PACKET SIZE (IN BYTES) | TOTAL PACKETS (%) | TOTAL BYTES (%) |
| --- | --- | --- |
| 40 | 38.9 | 4.4 |
| 1,500 | 11.5 | 48.7 |
| 552 | 10.1 | 15.8 |
| 44 | 6.1 | 0.8 |
| 576 | 4.9 | 7.9 |

This data shows that almost fifty percent of IP packets are between 40 and 44 bytes long. Assuming a data rate of 2.5 Gigabytes per second, switching these packets takes approximately 128 nanoseconds. Thus, for current packet sizes and data rates, a switching speed of approximately 100 nanoseconds is desirable. Existing switching technologies are either too expensive, or too slow for this application. For example, Lithium Niobate, semiconductor optical amplifiers, or electro-absorption modulators can switch in less than one nanosecond, a rate much faster than the optimal 100 nanosecond rate. These devices are prohibitively expensive, particularly when compared to the present invention. In addition, these devices tend to be polarization sensitive. Liquid crystal devices, thermo-optic devices, and micro-electro-optic switches using a single continuous membrane as a moveable mirror are capable of switching speeds of only up to one microsecond, too slow for optimal operation.

The present invention facilitates tuning the optical switch element to provide a variety of switching speeds. In a particular embodiment, the switch element can be tuned to provide a switching speed commensurate with a specified packet size or range of packet sizes. For example, the switch element can be tuned to provide switching speeds commensurate with average packet sizes encountered by the switch element. The present invention facilitates switching speeds of up to 10 nanoseconds, and can be tuned to provide an optimum switching speed of, for example, approximately 100 to 300 nanoseconds.

Figure 6A:
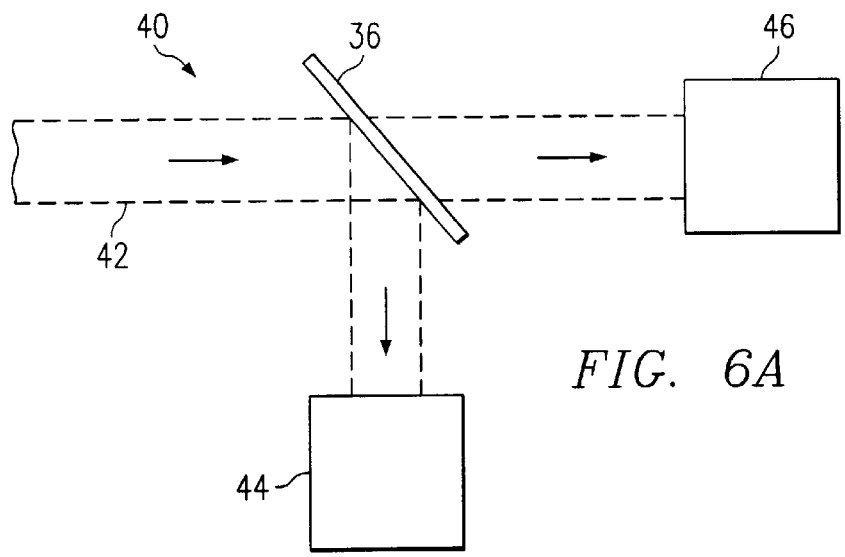
FIGS. 6A and 6B are schematic block diagrams of switching systems, which may be constructed according to the teachings of the present invention.

FIG. 6A illustrates one architecture of an optical switching system that may utilize switching element 36 constructed according to the teachings of the present invention. FIG. 6A illustrates a switching element 40 which is placed at an angle to an optical beam 42 and which selectively directs optical beam 42 to a first receiver 44 or a second receiver 46 using the switching element 36. In the illustrated embodiment, when the switching element 36 is in its undeformed state the mirror strips 24 and 26 are in their furthest position from fixed layer 14. In this state, as described previously, the switching element 36 is optically transmissive and the beam 42 will pass through element 36 and strike receiver 46. Optionally, a voltage can be placed between fixed layer 14 and movable mirror layer 22 causing the movable mirror layer 22 to deform towards the fixed layer 14. In this state, element 36 will reflect optical beam 42 toward receiver 44. In this manner, the beam 42 can be switched between receiver 44 and 46.

Figure 6B:
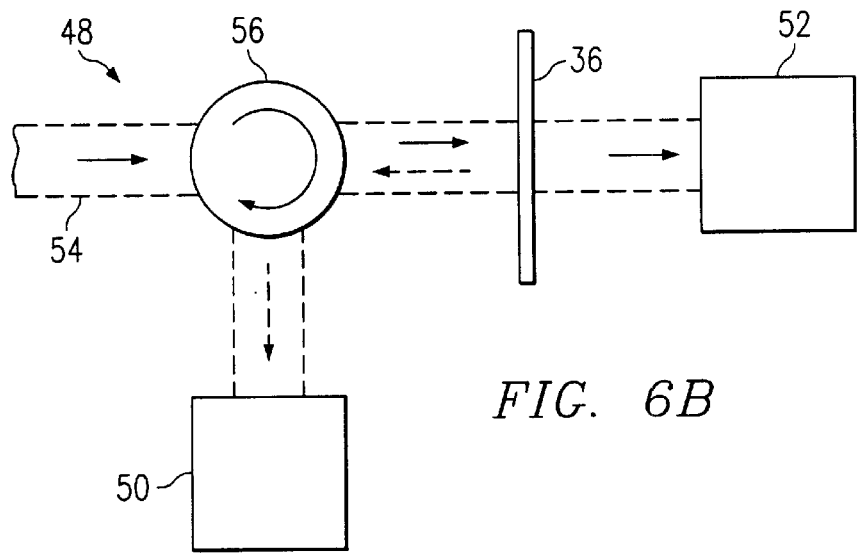

FIG. 6B illustrates an additional embodiment of a switching system, indicated generally at 48, which also utilizes switching element 36. Switching system 48 comprises a first receiver 50 and a second receiver 52. Switching system 48 is operable to switch an optical beam 54 which first passes through a circulator system 56. Optical beam 54 then either reflects off of element 36 or passes through element 36 to receiver 52. If element 36 is in its reflective, deformed state, optical beam 54 returns to circulator 56 where the returning beam is directed towards receiver 50. Circulator system 56 is operable to receive and deflect any reflected signal. In this manner, system 48 selectively routes beam 54 to either receiver 50 or 52 depending on whether or not element 36 is activated. System 48 does not require element 36 to be at an angle compared to the path of beam 54 as required with system 40 described with reference to FIG. 6A previously.

The examples described in FIGS. 6A and 6B assume a single fixed layer and a voltage applied between the fixed layer 14 and the movable mirror assembly 27 to deform moveable mirror layer 27 towards fixed layer 14. Of course, an outer fixed layer 230 could also, or alternatively be implemented and a voltage applied between moveable mirror assembly 27 and the outer fixed layer 230 to deform moveable mirror assembly 27 away from fixed layer 14, accomplishing a similar optical effect.

Figure 7A:
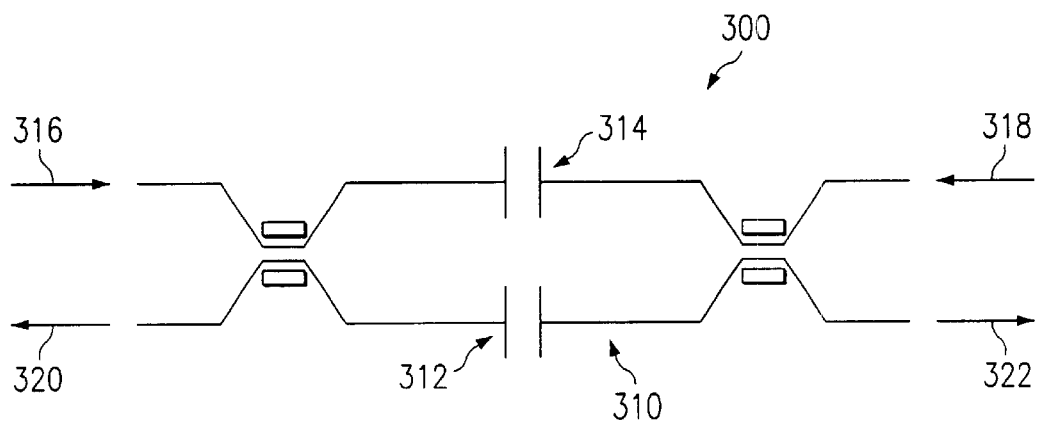
FIGS. 7A–7C are block diagrams showing various 2×2 switch configurations constructed according to the teachings of the present invention.
Figure 7B:
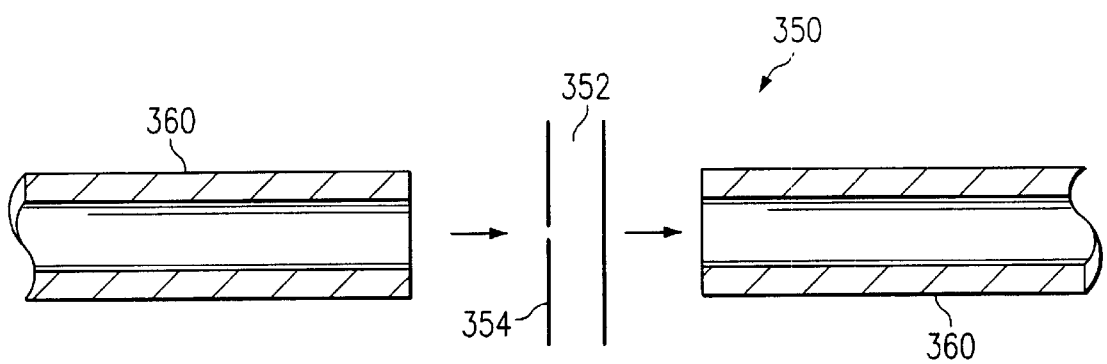
Figure 7C:
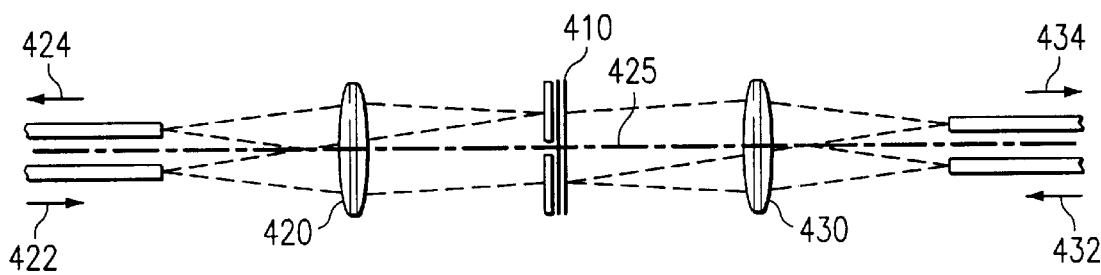

FIGS. 7A–7C are block diagrams showing various 2×2 switch configurations.

FIG. 7A is a block diagram showing a Mach-Zender based switch 300 implementing optical switch elements such as those depicted in FIGS. 1, 3, and/or 4. Switch 300 includes an interferometer 310. Interferometer 310 may comprise, for example, a fiber or a waveguide Mach-Zender interferometer. Optical switch elements 312 and 314 are coupled to interferometer 310 and receive incident optical signals at inputs 316 and 318, respectively. Depending on whether moveable mirror assembly 22 of each switching element 312 and 314 is in a deformed or a non-deformed state, optical switch elements 312 and 314 will transmit or reflect the incident optical signals. In a transmissive state, output 320 of switch 300 receives transmitted input 316, and output 322 receives transmitted input 316. In a reflective mode of operation, output 320 receives reflected input 316 and output 322 receives reflected input 318.

In another mode of operation, a relative phase between the two arms of the Mach-Zender interferometer can be used to switch the device. For example, a variable relative phase between the two arms of the interferometer can cause constructive or destructive interference, resulting in either an on or an off state.

FIG. 7B is a block diagram of an optical switch 350 using a Mach-Zender structure coupled to a single mode fiber. Switch 350 includes optical switch elements 352 and 354 coupled to a single mode fiber 360. In this embodiment, a Mach-Zender interferometer is implemented by overlapping the mode of fiber 360 with the mode of the fiber through switch elements 352 and 354. In operation, if switch elements 352 and 354 are in phase, then the phase pattern is symmetric and it couples to fiber 360. A phase difference of say, 180 degrees gives rise to an anti-symmetric mode, which prevents coupling between fiber 360 and switch elements 352 and/or 354.

In a particular embodiment, a phase difference between switch elements 352 and 354 can be achieved by causing the moveable mirror assemblies in those elements deform in opposite directions. In this way, a switching phase difference can be achieved with minimal deformation of each moveable mirror assembly. This minimal deformation results in lower drive voltages, and faster operation.

FIG. 7C is a block diagram showing yet another embodiment of a 2×2 switch. Switch 400 includes an optical switch element 410 positioned between two collimating lenses 420 and 430. Lenses 420 and 430 are spaced from switching element 410 by approximately the focal length of lenses 420 and 430. Inputs 422 and 423 are symmetrically placed slightly off axis from axis 425 of lenses 420 and 430, respectively. When switch element 410 is in a substantially transmissive mode, inputs received at input 422 are communicated to output 434, and inputs received at input 432 are communicated to output 424. When switch element 410 is in reflective mode, inputs received at input 422 are reflected to output 424, and inputs received at input 432 are reflected to output 434.

An N×N switch can be formed from a plurality of 2×2 switching blocks, such as switches 300, 350, and/or 400. The N×N switch could be configured, for example, as a crossbar switch or an N-stage planar switch.

In accordance with the teaching of the present invention a switching element and switching systems are described that provide for either a substantially transmissive state or a less transmissive state depending on whether or not a movable mirror assembly is deformed relative to a fixed layer. The movement of the movable mirror assembly affects the interference characteristics of an optical cavity between the fixed layer and the moveable mirror assembly. In one embodiment, the moveable mirror assembly includes segmented strips which provide for escape gaps for air to escape from the optical cavity the moveable mirror assembly deforms and restores. The strips have a relatively low mass and can be placed under a pre-selected tension to derive a desired resonant frequency and associated switching speed. For example, the present invention facilitates switching speeds on the order of 10 nanoseconds, and may be tuned to provide switching speeds of approximately 100 nanoseconds.

Figure 8:
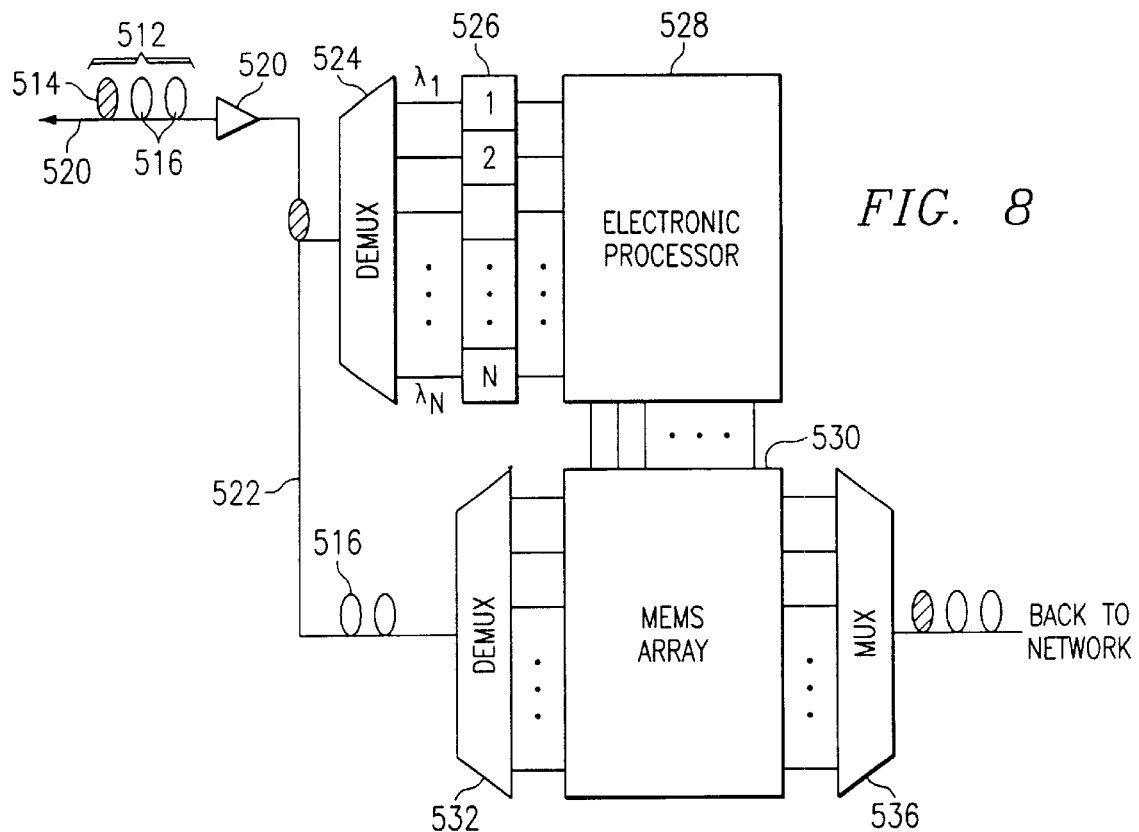
FIG. 8 is a block diagram of an exemplary electro-optic router constructed according to the teachings of the present invention.

FIG. 8 is a block diagram of an exemplary electro-optic router 500 constructed according to the teachings of the present invention. Electro-optic router 500 may include one or more optical amplifiers 510. In the illustrated embodiment, an optical amplifier 510 resides at the ingress end of the router, which receives optical signals 512 over a communication link 520. Electro-optic router 500 could also or alternatively include optical amplifiers at the egress end of the router, or at various other points within the router. Optical amplifiers 510 compensate for losses in the signal and line rates of, for example, OC-48 and OC-192 or higher. In the illustrated embodiment, communication link 520 comprises a single mode fiber carrying, for example, 100 wavelengths ranging from 1500 to 1600 nanometers and 2.5 Gb/s per channel.

Optical signal 512 comprises header information 514 and signal payload 516. Electro-optic router includes a fiber optic tap operable to communicate a first portion of optical signal 512 to a delay line 522 and a second portion of optical signal 512 to a demultiplexer 524. In the illustrated embodiment, demultiplexer 524 may comprise, for example, a wavelength grating router, operable to split the incoming signal into a plurality of wavelengths and send the plurality of wavelengths to an array of wavelength detectors 526.

Electro-optic router 500 also includes an electronic processor 528 operable to receive optical signals from detectors 526, to convert the optical signals to electronic signals, and perform various switching, routing, or other processing functions on the converted electronic signals. Electronic processor 528 is further operable to convert processed electronic signals into optical signals for transmission to a switching array 530.

Electro-optic router 500 further includes a demultiplexer coupled to delay line 522. In this embodiment, demultiplexer 532 comprises one or more wavelength grating routers. Both demultiplexer 532 and electronic processor 528 communicate with a switching array 530. In this example, switching array 530 comprises an array of micromechanical optical switching elements, such as those described with respect to FIGS. 1–6.

Switching array 530 receives processed optical header information from electronic processor 528 and optical payload information from delay line 522, and performs various switching functions on those signals. A multiplexer 536 receives switched optical signals from switching array 530 and transmits switched optical signals 540 to other network elements.

In operation, electro-optical router 500 receives a plurality of optical signals 512 and depending on, for example, the signal and line rates, may amplify those signals at optical amplifier 510. Fiber optic tap 518 receives optical signals 512 and taps header information 514 from optical signals 512. Header information 514 is passed to demultiplexer 524, while payload information 516 is communicated to delay line 522. Delay line 522 serves as a first-in-first-out (FIFO) buffer. The FIFO buffer length is set so as to provide enough time for electronic processor 528 to process the various header information 514.

While payload information 516 is delayed in FIFO buffer 522, electronic processor 528 converts optical header information 514 into electronic signals, and performs various processing on that header information. After completing processing of the electronic header information, electronic processor 528 converts the electronic header information back into one or more optical signals and transmits those signals to switching array 530.

Switching array 530 receives processed header information and unprocessed payload information 516, and associates the related payload and header information. Optical switching array 530 then switches the processed optical signals at rates ranging, for example, from approximately 10 to 100 nanoseconds or longer. Multiplexer 536 receives switched optical signals 540 from switching array 530 and transmits the switched optical signals to other network elements.

By transmitting the optical payload information transparently to electronic processor 528, electro-optical router 500 advantageously facilitates field coding. As such, header information can be electronically processed at rates on the order of 2.5 Gigabytes per second, while transparent optical payload information communicates at rates of 10 Gigabytes per second or higher. Electro-optic router 500 also facilitates parallel processing of multiple wavelength channels, increasing the speed and efficiency of the router. In a particular embodiment, differential logic such as Manchester coding can be used to compensate for switching contrast ratio.

In a particular embodiment, switching array 530 comprises optical switch elements that are substantially transmissive of optical signals while in a no-voltage state, and less transmissive of the optical signals when a voltage is applied. For example, switching array 530 may include optical switch elements, such as those shown in FIG. 1, where the air gap between the fixed layer 14 and the movable mirror assembly 22 during a no voltage state is an even integer multiple of one quarter wavelengths of the optical signal. In this manner, the switch elements remain transmissive during a failed condition, creating a fault tolerant optical switching device.

Figure 9:
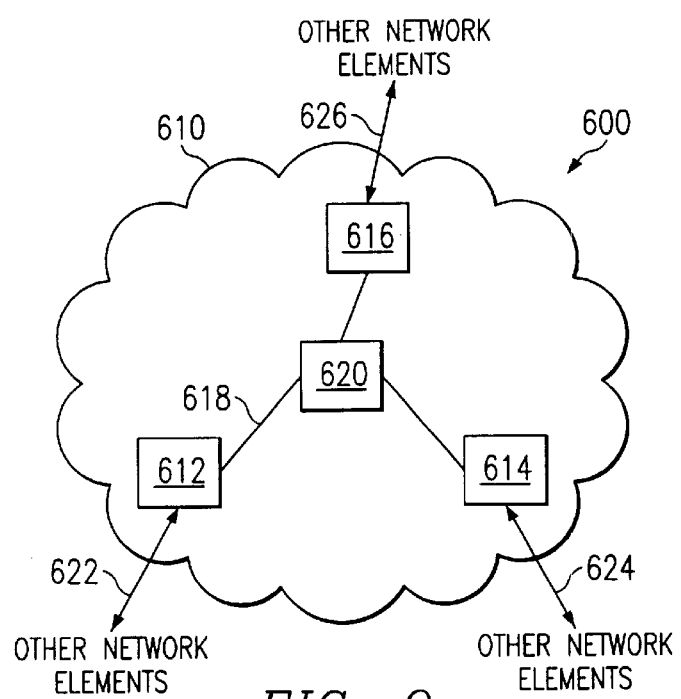
FIG. 9 is a block diagram showing an exemplary fault tolerant network constructed according to the teachings of the present invention.

FIG. 9 is a block diagram showing an exemplary fault tolerant network 600 constructed according to the teachings of the present invention. Fault tolerant network 600 includes a fiber core 610 comprising two or more edge nodes 612–616 coupled to at least one fault tolerant node 620 by communication links 618 operable to facilitate communication of optical signals. In this example, communication links 618 comprise single mode optical fibers. Communication links 618 could, however, comprise another medium operable to facilitate transmission of optical signals comprising one or a plurality of wavelengths.

In the illustrated embodiment, signals communicated through fiber core 610 pass through fault tolerant node 620. Although the illustrated embodiment shows a single fault tolerant node 620, fiber core 610 could alternatively comprise any number of fault tolerant nodes coupled to one or more edge nodes and arranged in a variety of configurations. For example, multiple fault tolerant nodes 620 could be arranged in a ring configuration, a star configuration, or any other configuration suitable to route and communicate optical signals through fiber core 610.

In this example, each of edge nodes 612–616 comprises an access router operable to receive electrical and/or optical signals and to convert the electrical signals into optical signals for transmission over fiber core 610. Edge nodes 612–616 provide electronic buffering until the signal is ready to be placed onto the optical backbone 618.

Edge nodes 612–616 may also examine header data of signals received from communication links 622–626 to identify a signal path through all or part of fiber core 610 toward a destination network element coupled to fiber core 610. Accordingly, edge nodes 612–616 attach a destination address to the data and frame or encapsulate the data for transmission across fiber backbone 618. Edge nodes receiving encapsulated data at egress points from fiber core 610 remove the framing that was attached at the ingress edge node and facilitate transmission of the signal toward a destination external network element. For example, where the signal received at the ingress edge node was an electrical signal, egress edge node 612–616 converts the optical signal received from optical backbone 618 to an electrical signal for transmission toward a destination external network element in an electrical format.

In this embodiment, fault tolerant node 620 comprises an electro-optic router, such as electro-optic router 500 shown in FIG. 8. In the embodiment shown here, fault tolerant node 620 comprises an electro-optic router having switch elements that are substantially transmissive of optical signals when no voltage is applied to the switch element. Some or all of edge nodes 612–616 could also comprise fault tolerant circuitry without departing from the scope of the invention.

In a particular embodiment, fault tolerant node 620 may comprise switch elements, such as those shown in FIG. 1, designed to provide a no-voltage air gap between fixed layer 14 and movable mirror layer 22 equal to an even integer multiple of one quarter of a wavelength of the optical signal. This design allows transmission of optical signals during a no-voltage state or during a failure state. In this way, fiber core 610 facilitates fault tolerant operation by passing optical signals in the event of a node failure.

In operation, each of edge nodes 612–616 communicates with one or more external network elements via communication links 622–666, respectively. Ingress edge nodes of fiber core 610 receive electrical and/or optical signals from communication links 622–626, convert the electrical signals to optical signals, determine destination addresses associated with the signals, frame the signals appending the destination addresses to the signals, and route the optical signals toward an egress edge node of fiber core 610.

Signals traversing fiber core 610 pass through one or more fault tolerant nodes 620. Each fault tolerant node 620 routes the optical signals toward the egress edge node using its switching array. The switch elements of fault tolerant nodes 620 operate in a substantially transmissive state when no voltage is applied, and in a less transmissive state when a voltage is applied between a fixed mirror surface and a moveable mirror assembly. In this way, fiber core 610 operates to facilitate pass through operation in the event of a fault within fiber core 610.

Although the present invention has been described in detail it should be understood that various changes, alterations, substitutions, and modifications may be made to the teachings described herein without departing from the spirit and scope of the present invention which is solely defined by the appended claims.

what is claimed is:

1. An optical communication device comprising:
a circulator operable to receive an input optical signal;
a first receiver coupled to a first output of the circulator;
a second receiver coupled to a second output of the circulator; and
an optical switching element coupled between the circulator and the second receiver, the optical switching element operable to selectively communicate the optical signal for receipt by the first or second receiver depending on an application of a control signal to the switching element;
wherein the optical switching element comprises:
a fixed layer disposed outwardly from a substrate; and
a unitary movable mirror assembly disposed outwardly from the fixed layer and forming with the fixed layer an optical cavity, the moveable mirror assembly operable to move relative to the fixed layer in response to a voltage applied to the moveable mirror assembly to affect a change in an optical characteristic of the optical cavity.

2. An optical processing device comprising:
a demultiplexer operable to receive a multiple wavelength input optical signal and to separate the multiple wavelength signal into a plurality of wavelength signals; and
an array of optical communication elements operable to receive at least some of the plurality of wavelength signals and to provide an optical processing function to the received wavelength signal, at least one of the optical communication elements comprising:
a fixed layer disposed outwardly from a substrate; and
a unitary movable mirror assembly disposed outwardly from the fixed layer and forming with the is fixed layer an optical cavity, the moveable mirror assembly operable to move relative to the fixed layer in response to a voltage applied to the moveable mirror assembly to affect a change in an optical characteristic of the optical cavity;
wherein the optical communication element is operable to change between a substantially transmissive state and a less than substantially transmissive state in response to the applied voltage.

3. The optical processing device of claim 2, further comprising a multiplexer operable to receive the at least some of the plurality of wavelength signals from the array and to combine those signals into a multiple wavelength output optical signal.

4. The optical processing device of claim 2, wherein the optical communication element is operable to change between a substantially transmissive state and a less than substantially transmissive state at a rate associated with an average size of a packet traversing the communication element.

5. The optical processing device of claim 2, wherein the fixed layer comprises a fixed mirror layer and wherein the optical cavity comprises a Fabry-Perot cavity.

6. The optical processing device of claim 2, wherein the optical communication element operates to substantially transmit an optical signal received when no voltage is applied and to substantially reflect the optical signal received when the voltage is applied.

7. An optical processing device comprising:
an optical tap operable to split off at least a portion of the optical signal;
a demultiplexer operable to receive the at least a portion of the optical signal and to separate the at least a portion of the optical signal into a plurality of wavelength signals; and
an array of optical communication elements operable to receive at least some of the plurality of wavelength signals and to provide an optical processing function to the received wavelength signal, at least one of the optical communication elements comprising:
a fixed layer disposed outwardly from a substrate; and
a unitary movable mirror assembly disposed outwardly from the fixed layer and forming with the fixed layer an optical cavity, the moveable mirror assembly operable to move relative to the fixed layer in response to a voltage applied to the moveable mirror assembly to affect a change in an optical characteristic of the optical cavity;
wherein the optical communication element is operable to change between a substantially transmissive state and a less than substantially transmissive state in response to the applied voltage.

8. The optical processing device of claim 7, further comprising a multiplexer operable to receive the at least some of the plurality of wavelength signals from the array and to combine those signals into a multiple wavelength output optical signal.

9. The optical processing device of claim 7, further comprising an optical amplifier operable to amplify the multiple wavelength signal.

10. The optical processing device of claim 7, wherein the optical communication element is operable to change between a substantially transmissive state and a less than substantially transmissive state at a rate associated with an average size of a packet traversing the communication element.

11. The optical processing device of claim 7, wherein the fixed layer comprises a fixed mirror layer and wherein the optical cavity comprises a Fabry-Perot cavity.

12. The optical processing device of claim 7, wherein the optical communication element operates to substantially transmit an optical signal received when no voltage is applied and to substantially reflect the optical signal received when the voltage is applied.

13. An optical communication device comprising:
a circulator operable to receive an input optical signal;
a first receiver coupled to a first output of the circulator;
a second receiver coupled to a second output of the circulator; and
an optical switching element coupled between the circulator and the second receiver, the optical switching element operable to selectively communicate the optical signal for receipt by the first or second receiver depending on an application of a control signal to the switching element;
wherein the optical switching element comprises:
a fixed layer disposed outwardly from a substrate; and
a unitary movable mirror structure disposed outwardly from the fixed layer and forming with the fixed layer a cavity, the moveable mirror structure operable to move relative to the fixed layer in response to a voltage applied to the moveable mirror structure to affect a change in a characteristic of the optical communication device.

14. An optical processing device comprising:
a demultiplexer operable to receive a multiple wavelength input optical signal and to separate the multiple wavelength signal into a plurality of wavelength signals; and
an array of optical communication elements operable to receive at least some of the plurality of wavelength signals and to provide an optical processing function to the received wavelength signal, at least one of the optical communication elements comprising:

a fixed layer disposed outwardly from a substrate; and
a unitary movable mirror structure disposed outwardly from the fixed layer and forming with the fixed layer a cavity, the moveable mirror structure operable to move relative to the fixed layer in response to a voltage applied to the moveable mirror structure to affect a change in a characteristic of the optical processing device;
wherein the optical communication element is operable to change between a substantially transmissive state and a less than substantially transmissive state in response to the applied voltage.

15. The optical processing device of claim 14, further comprising a multiplexer operable to receive the at least some of the plurality of wavelength signals from the array and to combine those signals into a multiple wavelength output optical signal.

16. The optical processing device of claim 14, wherein the optical communication element is operable to change between a substantially transmissive state and a less than substantially transmissive state at a rate associated with an average size of a packet traversing the communication element.

17. The optical processing device of claim 14, wherein the optical communication element operates to substantially transmit an optical signal received when no voltage is applied and to substantially reflect the optical signal received when the voltage is applied.

18. An optical processing device comprising:
an optical tap operable to split off at least a portion of the optical signal;
a demultiplexer operable to receive the at least a portion of the optical signal and to separate the at least a portion of the optical signal into a plurality of wavelength signals; and
an array of optical communication elements operable to receive at least some of the plurality of wavelength signals and to provide an optical processing function to the received wavelength signal, at least one of the optical communication elements comprising:
a fixed layer disposed outwardly from a substrate; and
a unitary movable mirror structure disposed outwardly from the fixed layer and forming with the fixed layer a cavity, the moveable mirror structure operable to move relative to the fixed layer in response to a voltage applied to the moveable mirror structure to affect a change in a characteristic of the optical processing device;
wherein the optical communication element is operable to change between a substantially transmissive state and a less than substantially transmissive state in response to the applied voltage.

19. The optical processing device of claim 18, further comprising a multiplexer operable to receive the at least some of the plurality of wavelength signals from the array and to combine those signals into a multiple wavelength output optical signal.

20. The optical processing device of claim 18, further comprising an optical amplifier operable to amplify the multiple wavelength signal.

21. The optical processing device of claim 18, wherein the optical communication element is operable to change between a substantially transmissive state and a less than substantially transmissive state at a rate associated with an average size of a packet traversing the communication element.

22. The optical processing device of claim 18, wherein the optical communication element operates to substantially transmit an optical signal received when no voltage is applied and to substantially reflect the optical signal received when the voltage is applied.

23. An optical processing device comprising:
a demultiplexer operable to receive a multiple wavelength input optical signal and to separate the multiple wavelength signal into a plurality of wavelength signals; and
an array of optical communication elements operable to receive at least some of the plurality of wavelength signals and to provide an optical processing function to the received wavelength signal, at least one of the optical communication elements comprising:
a fixed layer disposed outwardly from a substrate; and
a unitary movable mirror structure disposed outwardly from the fixed layer and forming with the fixed layer a cavity, the moveable mirror structure operable to move relative to the fixed layer in response to a voltage applied to the moveable mirror structure to affect a change in a characteristic of the optical processing device.

24. The optical processing device of claim 23, further comprising a multiplexer operable to receive the at least some of the plurality of wavelength signals from the array and to combine those signals into a multiple wavelength output optical signal.

25. The optical processing device of claim 23, wherein the optical communication element is operable to change between a substantially transmissive state and a less than substantially transmissive state in response to the applied voltage.

26. The optical processing device of claim 23, wherein the optical communication element is operable to change between a substantially reflective state and a less than substantially reflective state in response to the applied voltage.

27. The optical processing device of claim 23, wherein the fixed layer comprises a fixed mirror layer and wherein the cavity comprises a Fabry-Perot cavity.

28. An optical processing device comprising:
an optical tap operable to split off at least a portion of the optical signal;
a demultiplexer operable to receive the at least a portion of the optical signal and to separate the at least a portion of the optical signal into a plurality of wavelength signals; and
an array of optical communication elements operable to receive at least some of the plurality of wavelength signals and to provide an optical processing function to the received wavelength signal, at least one of the optical communication elements comprising:
a fixed layer disposed outwardly from a substrate; and
a unitary movable mirror structure disposed outwardly from the fixed layer and forming with the fixed layer a cavity, the moveable mirror structure operable to move relative to the fixed layer in response to a voltage applied to the moveable mirror structure to affect a change in a characteristic of the optical processing device.

29. The optical processing device of claim 28, further comprising a multiplexer operable to receive the at least some of the plurality of wavelength signals from the array and to combine those signals into a multiple wavelength output optical signal.

30. The optical processing device of claim 28, further comprising an optical amplifier operable to amplify the multiple wavelength signal.

31. The optical processing device of claim 28, wherein the optical communication element is operable to change between a substantially transmissive state and a less than substantially transmissive state in response to the applied voltage.

32. The optical processing device of claim 28, wherein the optical communication element is operable to change between a substantially reflective state and a less than substantially reflective state in response to the applied voltage.

33. The optical processing device of claim 28, wherein the fixed layer comprises a fixed mirror layer and wherein the cavity comprises a Fabry-Perot cavity.

* * * * *